United States Patent [19]

Chomet

[11] 4,130,833
[45] Dec. 19, 1978

[54] PAY TELEVISION SYSTEM

[75] Inventor: Marc Chomet, East Northport, N.Y.

[73] Assignee: Teleglobe Pay-TV System, Inc., Rego Park, N.Y.

[21] Appl. No.: 786,653

[22] Filed: Apr. 11, 1977

[51] Int. Cl.² .................. H04N 7/16; H04N 7/00
[52] U.S. Cl. ............................. 358/122; 358/84; 358/115; 358/123
[58] Field of Search ............... 358/114, 115, 122, 123, 358/84

[56] References Cited

U.S. PATENT DOCUMENTS

| | | | |
|---|---|---|---|
| 3,054,857 | 9/1962 | Weiss | 358/122 |
| 3,789,131 | 1/1974 | Harney | 358/122 |
| 3,826,863 | 7/1974 | Johnson | 358/122 |
| 3,885,089 | 5/1975 | Callais et al. | 358/122 |

Primary Examiner—S. C. Buczinski
Attorney, Agent, or Firm—Marianne Rich

[57] ABSTRACT

The standard composite television signal is modulated onto an intermediate frequency carrier signal. The so-modulated signal is applied to the input of a first and second frequency converter for conversion respectively to a first or second UHF or VHF output frequency. The two converters are enabled alternately, each for a predetermined number of frames. The resultant signals are summed and transmitted to a receiver location. At the receiver location, the power is split along two channels. Two tuner-mixers, one in each channel, and tuned, respectively, to the first and second output frequency, respectively convert the incoming signal components having the first and second frequency to the same intermediate frequency. The two intermediate frequency signals are summed and converted to the proper frequency for reception on standard television receiver. A program code detector at the receiver counts the number of consecutive outputs from at least one of the tuner-mixers and enables the billing system if the correct number of counts for a given program is present or disables the tuner-mixers if the number is incorrect.

3 Claims, 3 Drawing Figures

PAY TELEVISION SYSTEM

BACKGROUND OF THE INVENTION

The present invention relates to pay television systems. Known systems of this type may be divided into two categories. In the first, the television signal itself is encoded and the coding changed for each program. In the second category, no encoding of the television signal takes place, but the frequency of the carrier is changed so that the signal cannot be received on a particular station on the standard television receiver unless a decoder is activated. The former system requires a great deal of equipment since the timing and phase relationships must be very closely controlled. The second category requires considerably less equipment but results in very low security since a simple change of frequency will allow reception.

SUMMARY OF THE INVENTION

The present invention is a pay television system. It comprises means for furnishing a standard video signal, and intermediate frequency carrier signal furnishing means for furnishing an intermediate frequency carrier signal. Modulator means modulate said video signal onto said intermediate frequency carrier signal, thereby creating a modulated intermediate frequency carrier signal. Switch means are also provided. First and second frequency converter means are connected to the modulator means for alternately changing the frequency of said modulated intermediate frequency signal to a first and second output frequency under control of said switch means, thereby creating an encoded television signal having, alternately, a first and second component at said first and second output frequency. Finally, means are provided for sending said encoded television signal to at least one receiving location.

A standard television receiver is at said receiving location, as are first and second receiver means. The first receiver means is tuned to said first output frequency and responsive only to said first component of said encoded television signal, for receiving said encoded television signal and changing the frequency of said first component to a predetermined decoder frequency, thereby creating a first decoder signal. The second receiver means is tuned to said second output frequency and responsive only to said second component of said encoded television signal. The second receiver means receives said encoded television signal and changes the frequency of said second component to said decoder frequency, thereby creating a second decoder signal, said first and second decoder signals having the same frequency but occurring alternately, Finally, means are provided which are connected to said first and second receiver means, for combining said first and second decoder signals and furnishing a combined signal suitable for reception on said television receiver.

Program code detector means are connected to the output of at least one of said first and second receiver means and furnish an activating signal activating the billing system only if the number of consecutive output signals of the selected one of said receiver means corresponds to a number stored in a billing card or a billing memory. The same signal may also be utilized to activate a local oscillator which is required to supply the signal at the correct carrier frequency to the antenna of the television receiver.

The novel features which are considered as characteristic for the invention are set forth in particular in the appended claims. The invention itself, however, both as to its construction and its method of operation, together with additional objects and advantages thereof will thus be understood from the following description of specific embodiments when read in connection with the accompanying drawing.

DESCRIPTION OF PREFERRED EMBODIMENT

Figure 1:
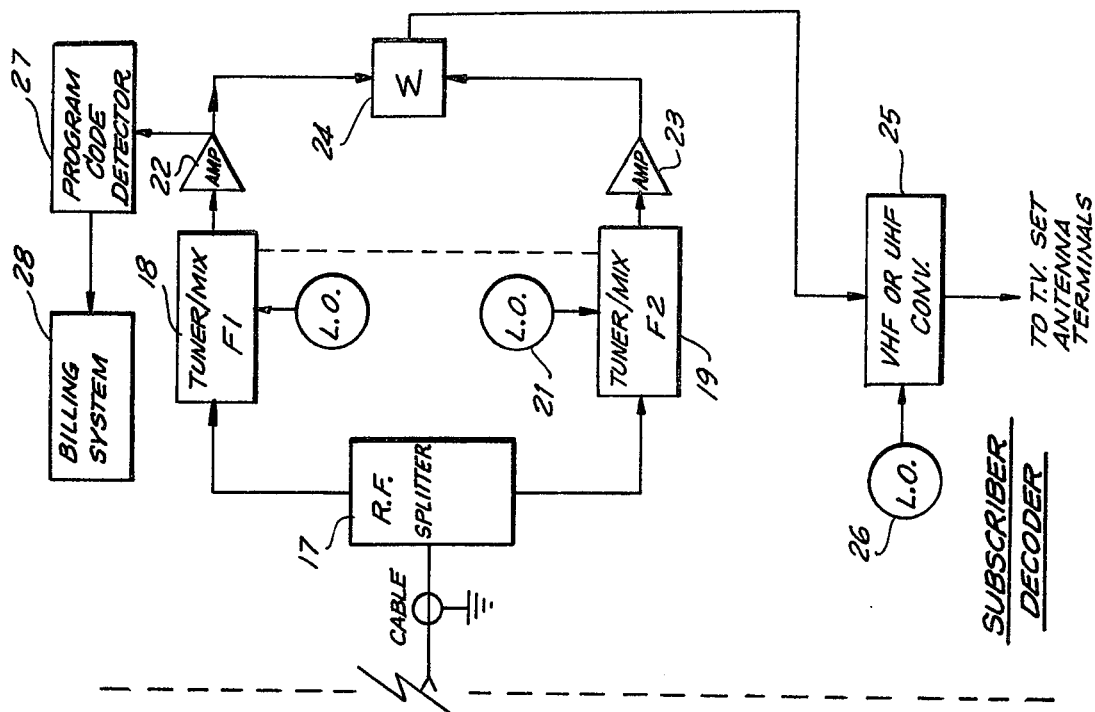
FIG. 1 shows the encoding and decoding systems of the present invention in block diagram form.

In FIG. 1, the standard composite television signal including all synchronization signals is applied to one input of a modulator 10 whose other input is connected to an IF oscillator 11. The modulated intermediate frequency carrier signal at the output of modulator 10 is applied to the inputs of two frequency converters 12 and 13. Frequency converter 12 converts the frequency of the signal applied to its input to a first output frequency suitable for cable transmission, while frequency converter 13 changes the frequency of the intermediate frequency carrier signal to a second output frequency different from the first output frequency but also in the cable transmission range. The converters are enabled alternately by means of a switch control 14 which in turn is controlled by a program code generator 15. There is thus an output from frequency converter 12 only in the absence of an output from frequency converter 13, and vice versa. The two signals are combined in a summing unit 16 and applied to the cable for transmission to the subscribers. The outputs of frequency converters 12 and 13 may, for example, be in the UHF range. The intermediate frequency at the inputs of converters 1 and 2 would normally be 45 MHz.

At the receiving end, the encoded television signal which has, alternately, a first and second component at the first and second output frequency respectively, is split by an RF power splitter 17 into two channels. In the first channel, a tuner-mixer 18 is tuned to the first output frequency, while in the second channel a tuner-mixer 19 is tuned to the second output frequency. In the first channel, the first component of the received television signal is heterodyned to the output of a local oscillator 20 such that an intermediate frequency signal, herein referred to as a first decoder signal, appears at the output of tuner-mixer 18 in response to the first component of the encoded television signal. Similarly, the second component of the encoded television signal is heterodyned in the second channel to the output of a local oscillator 21 whose frequency is so chosen that the intermediate frequency signal at the output of tuner-mixer 19, namely the second decoder signal, is of the same frequency as the first decoder signal. After amplification, respectively, in amplifiers 22 and 23, the first and second decoder signals are summed in a summing circuit 24 whose output is herein referred to as a combined signal. The combined signal is frequency converted to a VHF or UHF signal by a converter 25 cooperating with a local oscillator 26.

It will be noted that the above-described system would allow a non-subscriber to see and hear the program only for the short interval that it is on one or the other of the RF frequencies. Such a segment is not suitable for viewing.

The transmitted signal can be sent over any two frequencies that are within the cable bandwidth and not used for commercial television. Further, the system may be used for free television by allowing switch control 14 to remain in one position throughout the program. Also, the tuners in the decoder may be ganged, allowing the subscriber to select from a number of different programs which are transmitted simultaneously.

Figure 2:
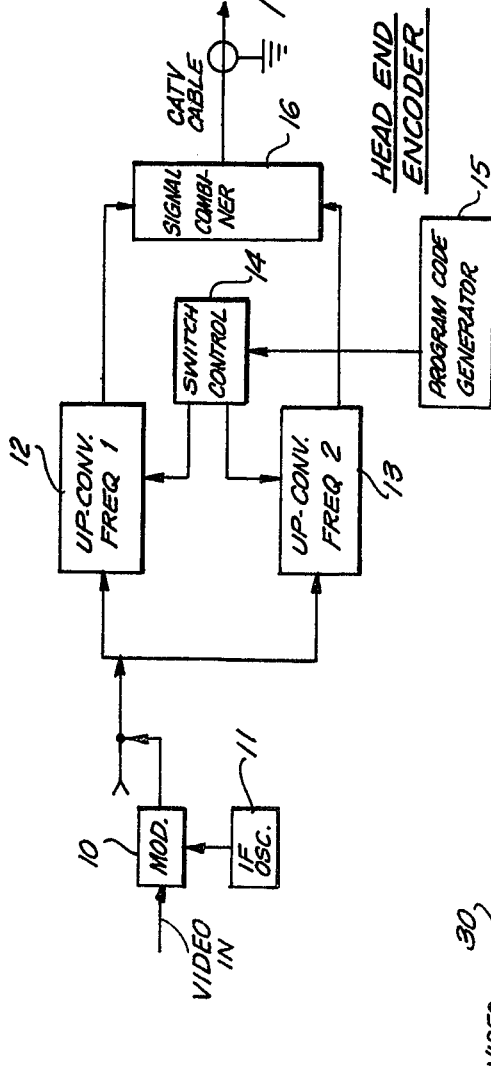
FIG. 2 is a schematic diagram of the program code generator and switch control shown in FIG. 1.
Figure 2:
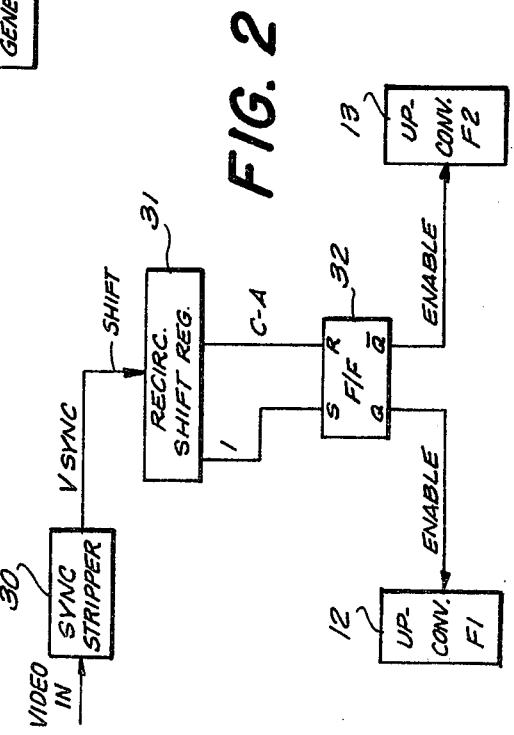
Figure 3:
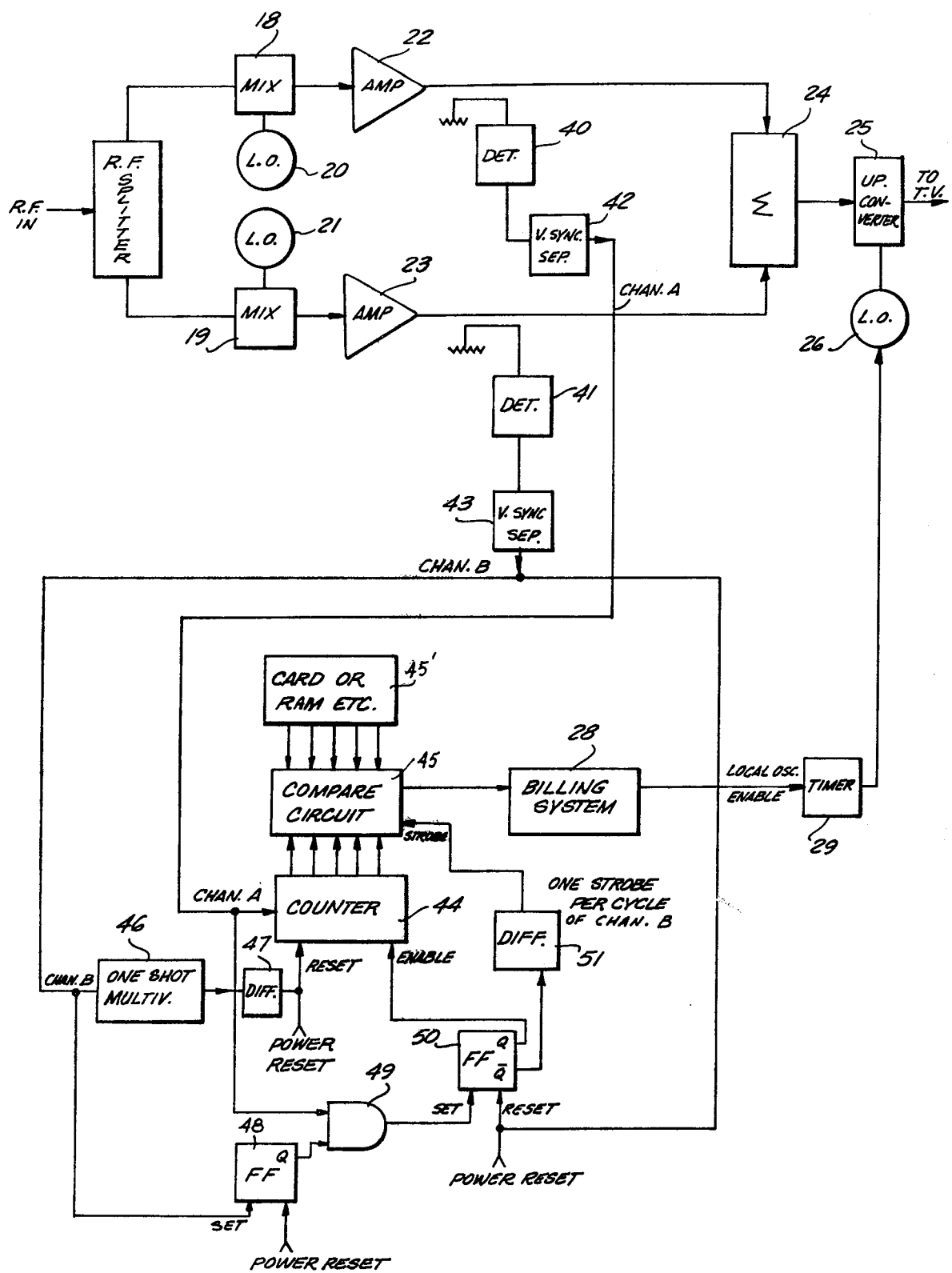
FIG. 3 is a more detailed diagram of the program code detector of FIG. 1.

The program code generator and switch control of FIG. 1 are shown in greater detail in FIG. 2. The input video signal is applied to a synchronization signal stripper 30 which generates the vertical synchronization signals at its output. These are applied to the shift input of a shift register 31 which is a recirculating shift register. As an illustration, it will be assumed that the total number of stages in the shift register is C and that the number of fields for which the frequency of the incoming signal is to be converted to the first output frequency is A while the number of fields for which it is to be converted to the second output frequency is B. A + B = C. In a preferred embodiment of the present invention C = 60, that is, the cycle time for a complete cycle is approximately 1 second. As is seen in FIG. 2, the "1" count of shift register 31 sets a flip-flop 32, while count C - A resets the flip-flop. The Q output of flip-flop 32 enables up-converter 12, while the Q output enables up-converter 13. The minimal circuitry described in relations to FIGS. 1 and 2 is all that is required if billing takes place on a monthly basis and no validation is desired. If billing is to take place on a per program basis and if it is desired that the receipt and proper processing of a signal be assured before a customer is billed, that is, if a validation capability is desired, the program code detector 27 of FIG. 1 must be added to the system. Program code detector 27 is shown in FIG. 3 interconnected with the basic receiver system. As shown in FIG. 3, a detector 40 taps a small percentage of the power in the first channel, while a detector 41 similarly taps the second channel. Vertical synchronizing signal separators 42 and 43 are connected to the outputs of detectors 40 and 41 respectively. Vertical synchronizing pulses thus appear at the output of signal separator 42 when a signal is present at the output of amplifier 22, while vertical synchronizing pulses appear at the output of vertical synchronizing signal separator 43 when a signal is present at the output of amplifier 23. Since, in the encoding process, the sum of the vertical synchronizing signals in the first channel (channel A) and those of the second channel (channel B) is to remain a constant, it is necessary only to count the vertical synchronizing pulses in one channel to determine whether the proper code is being received. In FIG. 3, the pulses in channel A are to be counted. These are applied to the counting input of a counter 44. The counter output signals, which signify the total number of vertical synchronization pulses counted, are applied to one input of a comparator circuit 45. The other input of the comparator circuit is energized by means of the billing card or by the output of a random access memory which may also contain other billing information. The input and output systems for such a random access memory are described in detail in a copending application Ser. No. 737,856, by H. George Pires entitled "Telephone Billing Apparatus for a Subscription Television System", filed Nov. 1, 1976, and assigned to the same assignee which is hereby incorporated by reference. The comparison is carried out upon receipt of a strobe input as will be described below. If the numbers check, a billing activating signal activates the billing system, and, further, a timer 29 is reset which enables local oscillator 26 for a predetermined time interval. The timer must, of course, be reset periodically. Thus local oscillator 26 will not be activated if, for a predetermined length of time, the number in counter 44 does not check with that supplied by the billing card or memory. The signal resetting the timer is herein called a decoder enabling signal.

It is the function of the remainder of the circuitry of FIG. 3 to assure that the counter is properly reset and that the strobe signal occurs at the right time, namely when all vertical synchronizing pulses from channel A have been counted. To reset the counter, the vertical synchronizing pulses of channel B are utilized. These set a one shot multivibrator 46 whose trailing edge is differentiated in a differentiating circuit 47 and then applied to the reset input of counter 44. One shot multivibrator 46 thus serves as a time delay. The time delay chosen is less than the time for one field so that the counter is reset prior to the receipt of a vertical synchronizing signal on channel A in response to the last pulse from channel B. The vertical synchronizing pulses of channel B are also applied to the set input of a flip-flop 48 whose Q output is applied to one input of an AND gate 49. The other input of AND gate 49 is connected to the output of vertical synchronizing signal separator 42. AND gate 49 thus transmits channel A pulses only after flip-flop 48 has been set by a pulse from channel B. Flip-flop 48 is reset when the power to the system is turned on. The pulses transmitted by AND gate 49 set a flip-flop 50. The Q output of flip-flop 50 enables counter 44. Counter 44 is thus only enabled when a full cycle of channel A pulses will be received. Flip-flop 50 is reset by pulses in channel B. It is further reset when the power is first turned on. When flip-flop 50 resets, the Q output goes from a low to a high. This change of state is differentiated in a differentiating circuit 51 and used to strobe the comparator circuit 45. The comparison must, of course, be completed before the same pulse on channel B, as delayed by multivibrator 46, resets counter 44.

It will be noted that the above-described system, either with or without the validation and billing capability, is particularly simple and economic to implement. It may also be used for over-the-air transmission.

While the invention has been illustrated in preferred embodiments, it is not to be limited to the circuits and structures shown since many variations thereof will be evident to one skilled in the art and are intended to be encompassed in the present invention as set forth in the following claims.

What is claimed is:

1. In a pay television system having transmitting means for transmitting a television signal at a first output frequency during first selected time intervals and at a second output frequency during second selected time intervals excluding said first selected time interval, a receiving system comprising, in combination, a television receiver; first receiver means (18) tuned to said first output frequency and rejecting said second output frequency for receiving said encoded television signal and changing said first output frequency to a predetermined decoder frequency, thereby creating a first decoder signal; second receiver means (19) tuned to said second output frequency and rejecting said first output frequency for receiving said encoded television signal and changing said second output frequency to said predetermined decoder frequency thereby creating a second decoder signal, said first and second decoder signals having the same frequency but occurring alternately; and summing means (22-24) continously and simultaneously connected to both said first and second receiver means for summing said first and second decoder signal and furnishing a combined signal suitable for reception on said television receiver.

2. In a pay television system having cyclically operable transmitting means for transmitting a television signal at a first output frequency during a predetermined number of first selected time intervals in each operating cycle thereof and at a second output frequency differing from said first output frequency during second selected time intervals excluding said first selected time intervals, a receiving system, comprising, in combination, a television receiver; first receiver means (18) tuned to said first output frequency and rejecting said second output frequency for receiving said encoded television signal and changing said first output frequency to a predetermined decoder frequency thereby creating a first decoder signal; second receiver means (19) tuned to said second output frequency and rejecting said first output frequency for receiving said encoded television signal and changing said second output frequency to said predetermined decoder frequency thereby creating a second decoder signal, said first and second decoder signals having the same frequency but occurring alternately; cyclically operable program code detector means (40, 42, 44, 45) coupled to said first receiver means for counting the number of said first selected time intervals in each operating cycle thereof, furnishing a counting signal corresponding to the number of so-counted first selected time intervals, comparing said counting signal to a comparator reference signal corresponding to said predetermined number and furnishing an enabling signal upon correspondence between said counting signal and said comparator reference signal; means (45') for furnishing said comparator reference signal; and combining means (24, 25, 26) connected to said first and second receiver means and said program code detector means and operative only in response to said enabling signal for combining said first and second decoder signal to furnish a combined signal suitable for reception on said television receiver.

3. A pay television system as set forth in claim 2, further comprising a billing system connected to said program code detector means and operative only in response to said enabling signal, whereby a charge is entered for a program only when said receiver means is correctly operative.

* * * * *